United States Patent [19]

Hida et al.

[11] Patent Number: 5,607,368

[45] Date of Patent: Mar. 4, 1997

[54] AUTOTENSIONER

[75] Inventors: Yoshikazu Hida; Tomoyoshi Izutsu; Hisashi Hayakawa, all of Iwata, Japan

[73] Assignee: NTN Corporation, Osaka, Japan

[21] Appl. No.: 492,573

[22] Filed: Jun. 20, 1995

[30] Foreign Application Priority Data

Jun. 20, 1994 [JP] Japan .................................. 6-137360

[51] Int. Cl.⁶ .................................................. F16H 7/08
[52] U.S. Cl. ........................................ 474/110; 474/135
[58] Field of Search .................................. 474/110, 101, 474/133, 135

[56] References Cited

U.S. PATENT DOCUMENTS

| | | | |
|---|---|---|---|
| 4,973,290 | 11/1990 | Hans et al. | 474/135 X |
| 5,116,284 | 5/1992 | Oho | 474/135 X |
| 5,458,542 | 10/1995 | Sakai et al. | 474/135 |
| 5,480,358 | 1/1996 | Sakai et al. | 474/135 X |

*Primary Examiner*—Roger J. Schoeppel
*Attorney, Agent, or Firm*—Wenderoth, Lind & Ponack

[57] ABSTRACT

An autotensioner which is of more compact structure and can be mounted in a limited space. The autotensioner has a fixed member, an arm pivotally mounted on the fixed member, a pulley support shaft mounted on the arm, a pulley rotatably mounted on the pulley support shaft, a cylinder having a damper mounted therein and mounted on the arm, the arm being pivotable about an axis and both the pulley support shaft and the cylinder being mounted on the arm at positions offset from the axis, the damper having a rod mounted in the cylinder so as to be pushed out of and into the cylinder, and a stopper fixed to the fixed member, the rod being kept in contact with the stopper.

3 Claims, 10 Drawing Sheets

AUTOTENSIONER

BACKGROUND OF THE INVENTION

This invention relates to an autotensioner for adjusting the tension in a timing belt or chain used with an automotive engine, or belts for driving engine auxiliaries.

Figure 13:
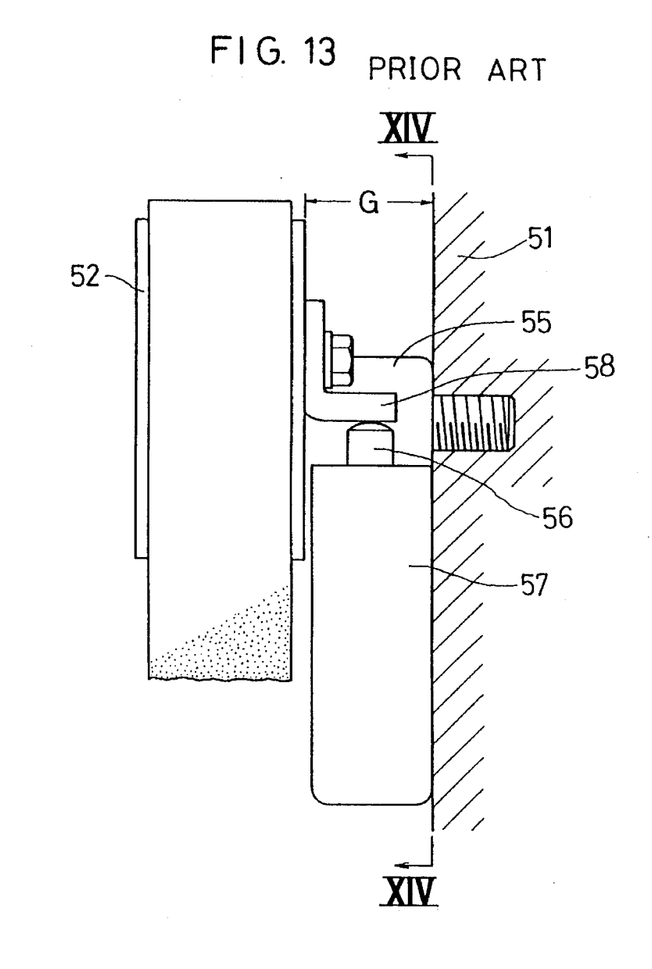
FIG. 13 is a side view of the prior art autotensioner.
Figure 14:
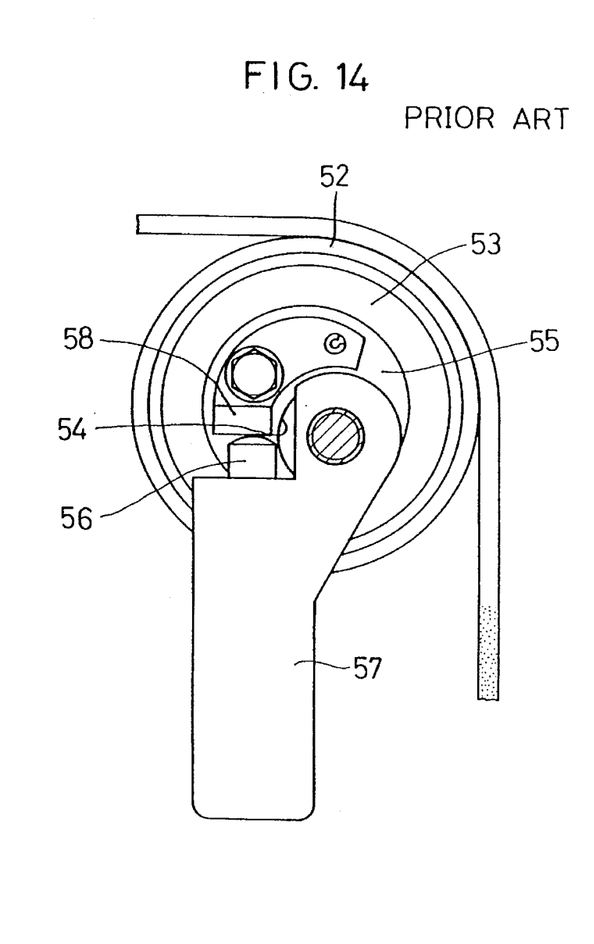
FIG. 14 is a sectional view taken along line XIII—XIII of FIG. 13.

FIGS. 13 and 14 show one of such conventional autotensioners.

This autotensioner has a pulley 52, a rolling contact bearing 53 rotatably supporting the pulley 52, and a pivot shaft 55 fixed to the inner ring of the rolling bearing 53. The pivot shaft 55 has a hole 54 having its axis offset from the axis of the bearing 53. The rolling bearing 53, the pivot shaft 55 and a cylinder 57 with a built-in hydraulic damper mechanism are fixed to the fixed member 51 such as an engine block. It has a rod 56 movable into and out of the cylinder and pressed against a stopper 58 protruding from an end of the pivot shaft 55.

When the pulley 52 pivots following the slackening of the belt, the rod 56 protrudes quickly, eliminating any gap between the rod and the stopper 58. When the tension in the belt increases, the rod 56 is pushed by the stopper 58 of the pivot shaft 55 and retracts slowly into the cylinder 57 due to the damping action of the hydraulic damper. The autotensioner is thus capable of keeping the tension in the belt constant.

With this type of conventional autotensioner, it is necessary to provide a gap G between the pulley 52 and the fixed member 51 in order to accommodate the cylinder 57 with the built-in hydraulic damper and the stopper 58 provided on the end of the pivot shaft 55 and adapted to be brought into contact with the rod 56 of the cylinder 57. The gap G adds to the height of the entire autotensioner.

Such a tall autotensioner cannot be mounted on an engine having only a limited space between the belt and the engine block.

An object of this invention is to provide an autotensioner which is low in height and which has a damper and a pulley support portion in a compact structure.

SUMMARY OF THE INVENTION

According to this invention, there is provided an autotensioner comprising a fixed member, an arm pivotably mounted on the fixed member, a pulley support shaft mounted on the arm, a pulley rotatably mounted on the pulley support shaft, a cylinder having a damper mounted therein and mounted on the arm, the arm being pivotable about an axis and both the pulley support shaft and the cylinder being mounted on the arm at positions offset from the axis, the damper having a rod mounted in the cylinder so as to be pushed out of and into the cylinder, and a stopper fixed to the fixed member, the rod being kept in contact with the stopper.

From another aspect of the invention, there is provided an autotensioner comprising a fixed member, a pulley support shaft mounted on the fixed member so as to be pivotable about an axis, a pulley rotatably mounted on the pulley support shaft, a coupling member mounted on the pulley support shaft at a position offset from the axis, a cylinder having a damper mounted therein and pivotably mounted on the fixed member, the damper having a rod mounted in the cylinder so as to be pushed out of and into the cylinder, and a link for coupling the rod and the coupling member together.

In the first arrangement, the cylinder with the built-in damper pivots with the pulley. The damper performs its damping function with its rod kept in contact with the stopper. In the second arrangement, the damper performs its damping function by protruding and retracting the rod of the cylinder to which the pivoting motion of the pulley is transmitted through the link.

In either arrangement, the pulley and the cylinder are arranged in parallel in a single plane, so that the height of the entire autotensioner is kept low.

BRIEF DESCRIPTION OF THE DRAWINGS

Figure 1:
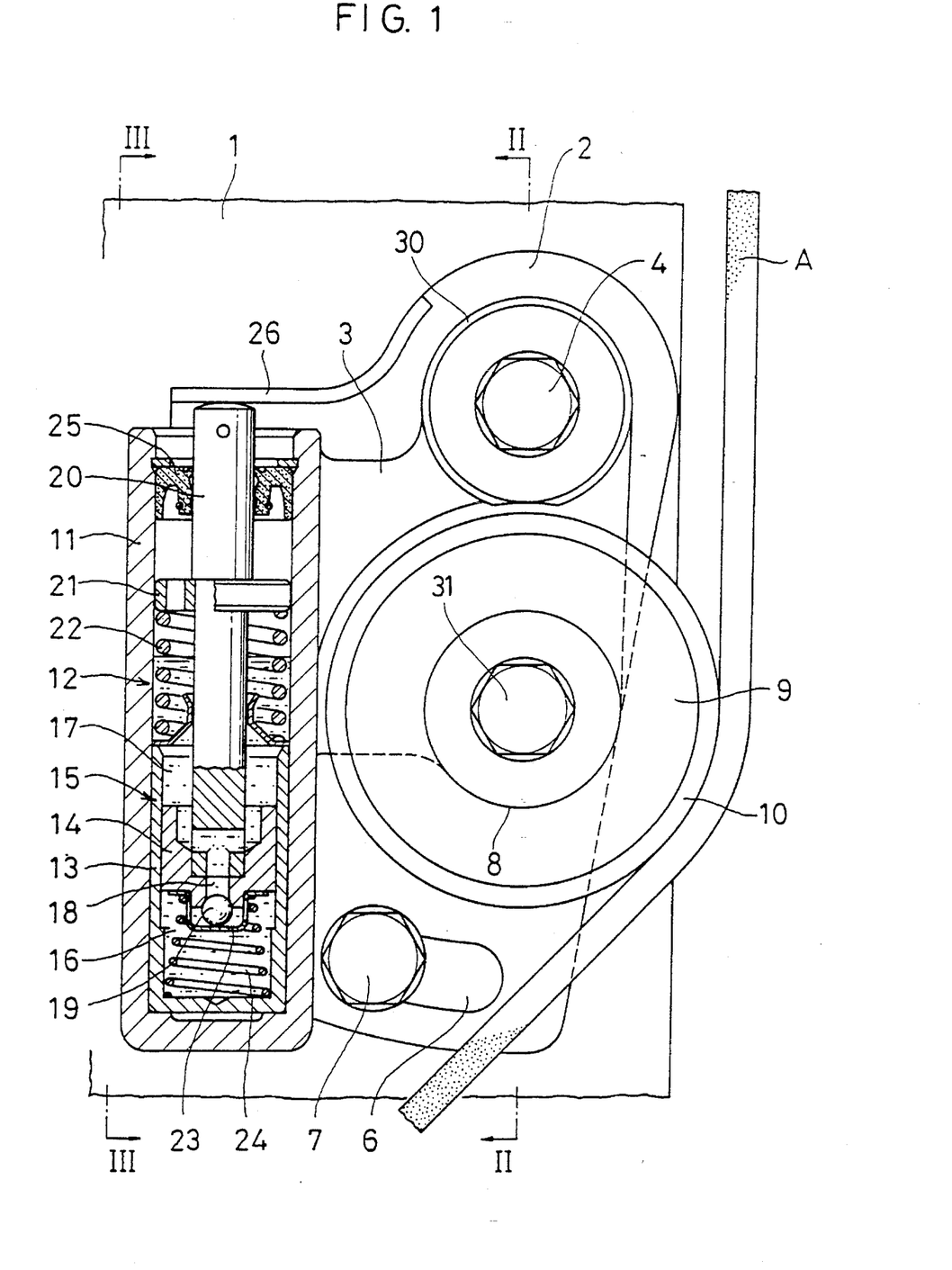
FIG. 1 is a vertical sectional front view of a first embodiment.
Figure 2:
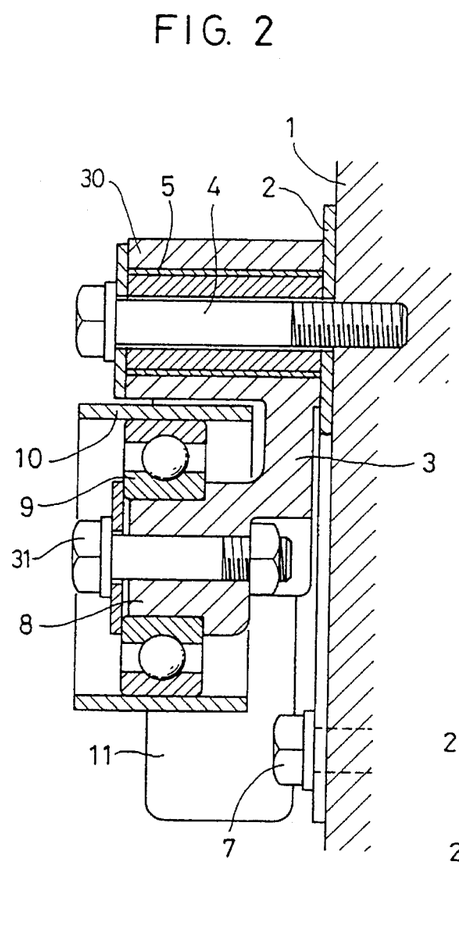
FIG. 2 is a sectional view taken along line II—II of FIG. 1.

Other features and objects of the present invention will become apparent from the following description made with reference to the accompanying drawings, in which:

FIGS. 1 and 2 show a first embodiment of this invention.

DETAILED DESCRIPTION OF THE PREFERRED EMBODIMENT

A base plate 2 is fixedly mounted on an engine block 1. An arm 3 is mounted on the base plate 2.

The arm 3 has at its end a boss 30 supported by a bolt 4 through a bearing sleeve 5. The bolt 4 extends through the boss 30 and the base plate 2 and is fixed to the engine block 1. The arm 3 is supported so as to be pivotable about the bolt 4.

The base plate 2 is fixedly mounted on the engine block 1 by means of the bolt 4 and another bolt 7 extending through an elongated hole 6 formed in the base plate at the end remote from the bolt 4.

The arm 3 is integrally formed with a pulley support shaft 8 on which is rotatably mounted a pulley 10 through a bearing 9, which is fixed to the pulley support shaft 8 by a mounting bolt 31.

A cylinder 11 with a built-in hydraulic damper 12 is integrally mounted on the arm 3, alongside the pulley support shaft 8. The hydraulic damper 12 has a sleeve 13 mounted in the cylinder 11 and a plunger 14 slidably mounted in the sleeve 13. The plunger 14 divides a hydraulic oil chamber 15 in the cylinder 11 into a pressure chamber 16 and a reservoir chamber 17. The plunger 14 has a passage 18 through which the pressure chamber 16 communicates with the reservoir chamber 17. Provided in the passage 18 is a check valve 19 adapted to close the passage 18 when the oil pressure is higher in the pressure chamber 16 than in the reservoir chamber 17.

A rod 20 is connected to the plunger 14. It has a shoulder portion to which a wear ring 21 is secured. A return spring 22 is mounted between the wear ring 21 and the top end of the sleeve 13. It urges the plunger 14 and the rod 20 in such a direction that the rod protrudes from the cylinder 11.

The pressure chamber 16 contains a retainer 23 and a spring 24 biasing the plunger 14 upward to press it against the rod 20. An oil seal 25 is provided near the opening of the cylinder 11.

Figure 3:
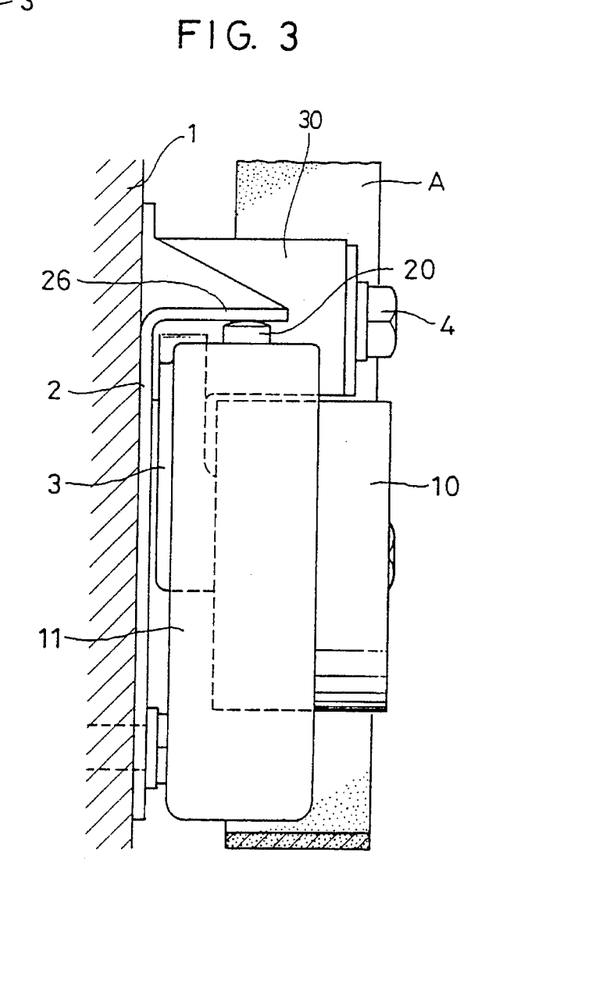
FIG. 3 is a side view taken along line III—III of FIG. 1.

The rod 20 of the hydraulic damper 12 has its protruding end abutting a stopper 26 extending perpendicularly from the edge of the base plate 2 facing the cylinder 11 (see FIG. 3).

In operation, while the tension in the belt A is equal to the biasing force of the return spring 22, the arm 3 is kept stationary. When the former increases, the arm 3 begins to pivot clockwise in FIG. 1 about the bolt 4. Since the cylinder 11, fixed to the arm 3, pivots together with the arm, the rod 20 is pressed hard against the stopper 26. The rod 20 is thus urged into the cylinder 11, so that the plunger 14 is pushed toward the pressure chamber 16. This increases the pressure in the pressure chamber, so that the passage 18 is closed by the check valve 19. The hydraulic oil in the pressure chamber 16 thus gradually leaks through a slight gap between the plunger 14 and the sleeve 13 into the reservoir chamber 17, damping the movement of the plunger 14 and the rod 20. This allows the arm 3 and the pulley 10 to pivot slowly until the belt tension decreases.

On the other hand, when the tension in the belt decreases, the arm 3 will pivot counterclockwise about the bolt 4, so that the cylinder 11 pivots in a direction away from the stopper 26, allowing the rod 20 to protrude from the cylinder 11 under the force of the return spring 22. As the rod 20 protrudes from the cylinder, the plunger 14 rises together with the rod 20. This reduces the pressure in the pressure chamber 16, so that the check valve 19 moves to the position where the passage 18 is fully opened, thereby allowing the hydraulic oil in the reservoir chamber 17 to flow through the passage 18 into the pressure chamber 18. The rod 20 can thus protrude quickly from the cylinder toward the stopper 26. This increases the tension to the belt quickly and the arm 3 pivots to a position where the belt tension becomes equal to the biasing force of the return spring 22.

Since the pulley support shaft 8, the pulley 10 and the cylinder 11 with the built-in damper 12 are all mounted on the arm 3, the entire autotensioner of this embodiment is much lower in height than any conventional autotensioner. Thus, even if the space between the engine block 1 and the belt A is rather narrow, it is possible to mount the autotensioner of the embodiment.

Heretofore, it was difficult to mount the stopper on an end of the engine block 1. According to the invention, the stopper 26 is provided on the base plate 2. Thus, the autotensioner of the present invention can be easily mounted even on an end of the engine block simply by forming a bolt hole in the engine block and securing the base plate 2 to the engine block with a bolt.

Figure 4:
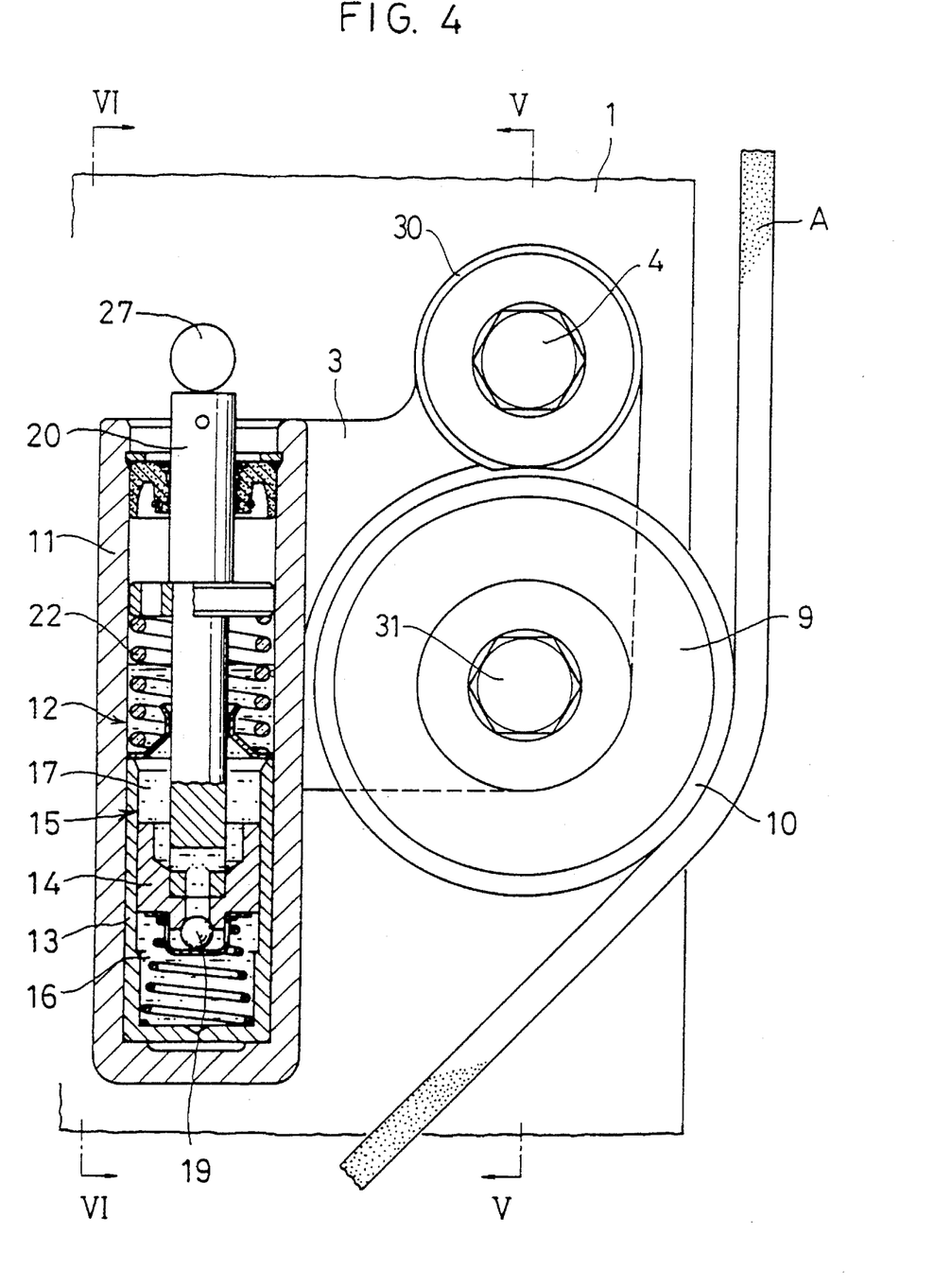
FIG. 4 is a vertical sectional front view of a second embodiment.
Figure 5:
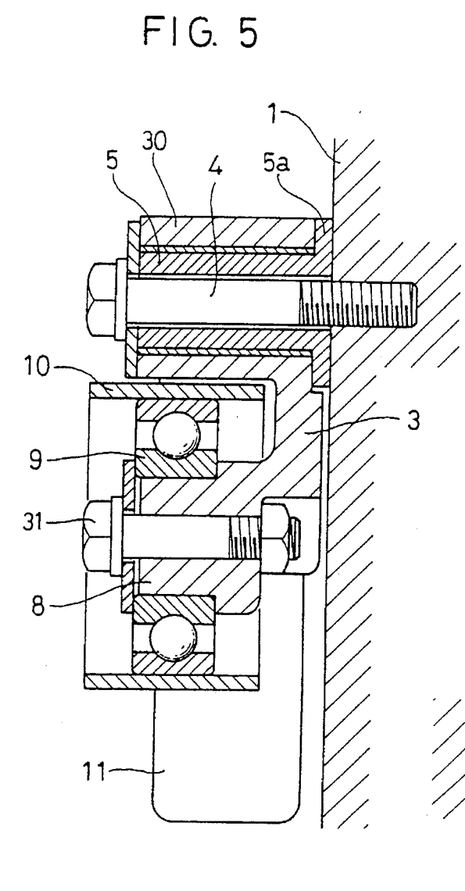
FIG. 5 is a sectional view taken along line V—V of FIG. 4.
Figure 6:
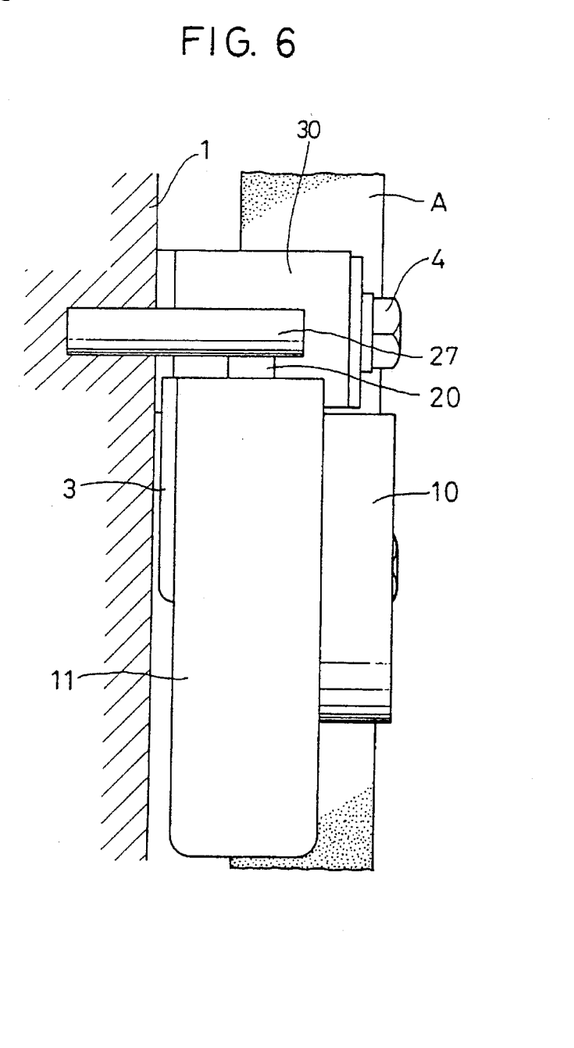
FIG. 6 is a side view taken along line VI—VI of FIG. 4.

FIGS. 4 through 6 show the second embodiment.

In this embodiment, there is no base plate provided between the arm 3 and the engine block 1 in the first embodiment. Instead, the bearing sleeve 5 is provided with a flange 5a that bears on the engine block 1, supporting the boss 30. The arm 3 is pivotably supported by the bolt 4 extending through the bearing sleeve 5.

A stopper pin 27 protrudes from the engine block 1. The rod 20 of the hydraulic damper 12 is adapted to butt the stopper pin 27.

Otherwise, this embodiment is the same both structurally and functionally as the first embodiment. Thus, we denote like elements by like numerals and omit their description.

Figure 7:
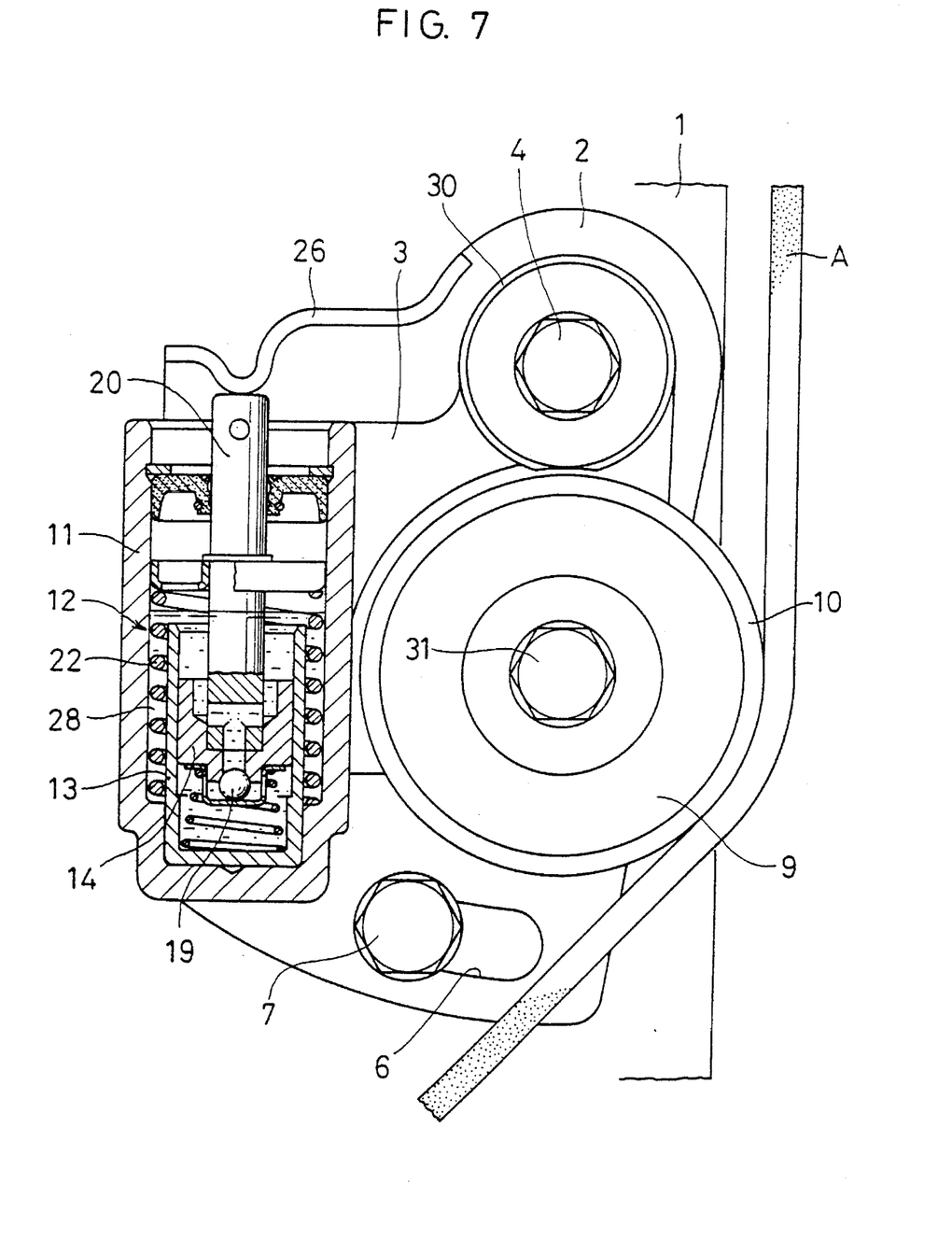
FIG. 7 is a front view in vertical section of a third embodiment.

FIG. 7 shows the third embodiment.

This embodiment is the same as the first embodiment in that the base plate 2 is provided between the arm 3 and the engine block 1 and that the stopper 26 is provided on the base plate 2, but differs in the structure of the hydraulic damper 12 mounted in the cylinder 11.

Namely, the hydraulic damper 12 of this embodiment has an annular gap 28 between the cylinder 11 and the sleeve 13. The return spring 22 is mounted in this gap 28. With this arrangement, it is possible to shorten the entire length of the hydraulic damper 12, and thus the entire weight of the arm 3. Since the inertia weight of the arm 3 is small, the hydraulic damper 12 can perform its damping action with improved responsiveness. Thus, the damper can perform stably its tension adjusting function even if high-frequency vibrations are transmitted from the belt A to the cylinder 11, which is integral with the pulley 10.

Figure 8:
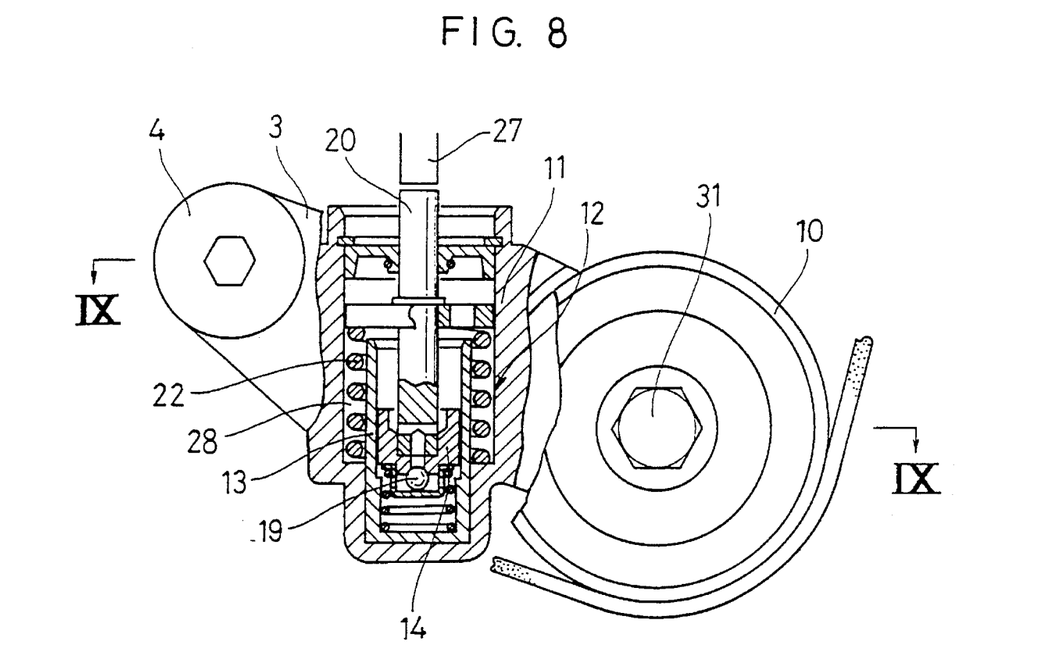
FIG. 8 is a partially cutaway front view of a fourth embodiment.
Figure 9:
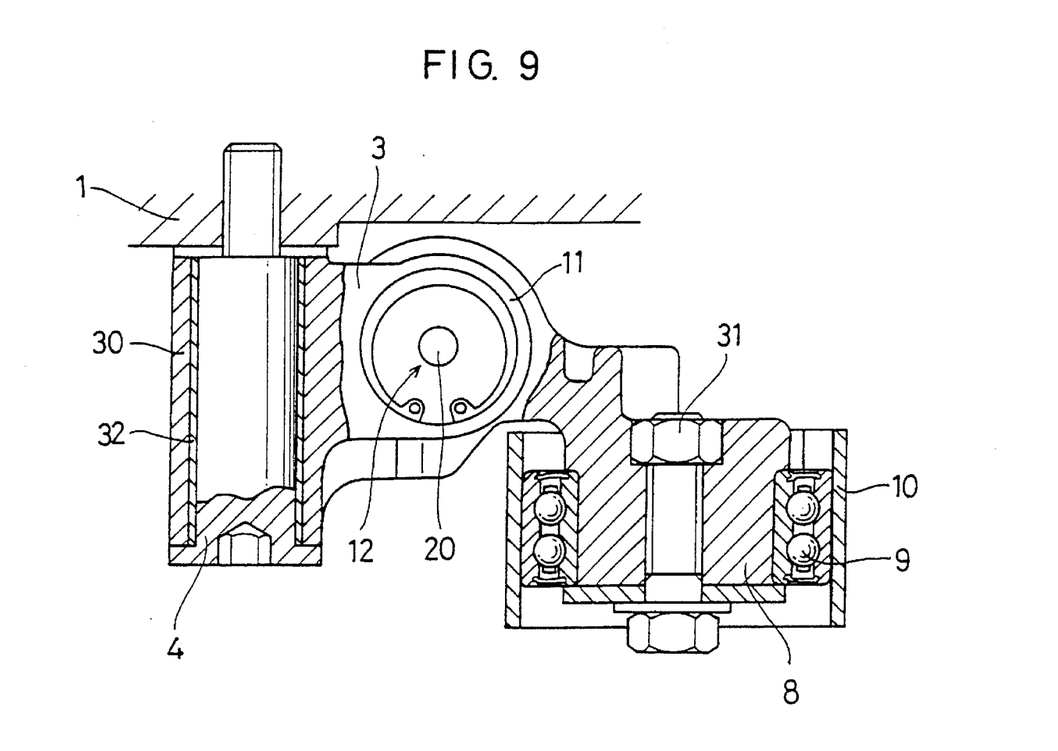
FIG. 9 is a sectional view taken along line IX—IX of FIG. 8.

FIGS. 8 and 9 show the fourth embodiment, in which the arm 3 has a boss 30 supported by a bolt 4 through a liner 32. The bolt 4 extends through the boss 30 and is fixed to the engine block 1. The arm 3 is supported so as to be pivotable about the bolt 4.

The arm 3 carries a pulley support shaft 8 at its free end. A pulley 10 is mounted on the pulley support shaft 8 through a bearing 9 by means of a bolt 31.

A cylinder 11 with a built-in hydraulic damper 12 similar to the one of the third embodiment (see FIG. 7) is fixedly mounted on the arm 3 between the boss 30 and the pulley support shaft 8.

A stopper pin 27 protrudes vertically from the engine block 1 at a position opposite the rod 20 of the hydraulic damper 12.

Otherwise, this embodiment is the same both structurally and functionally as the other embodiments.

In the embodiments so far discussed, the rod 20 of the hydraulic damper 12 is kept in contact with the stopper 26 or stopper pin 27. Due to its reaction force, the arm 23 and the pulley 10 mounted on the arm 3 pivot to adjust the tension in the belt A.

Figure 10:
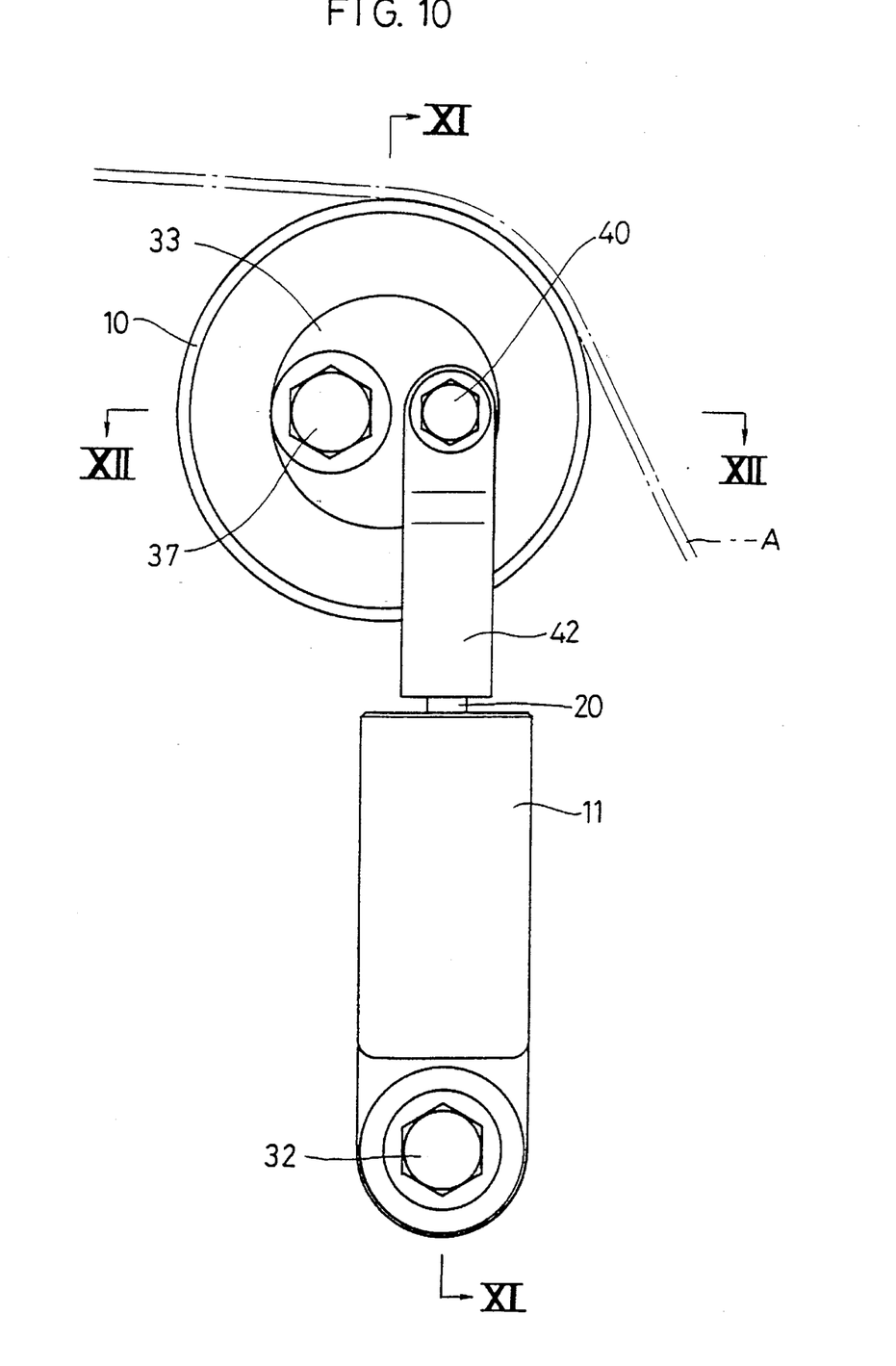
FIG. 10 is a front view of a fifth embodiment.
Figure 11:
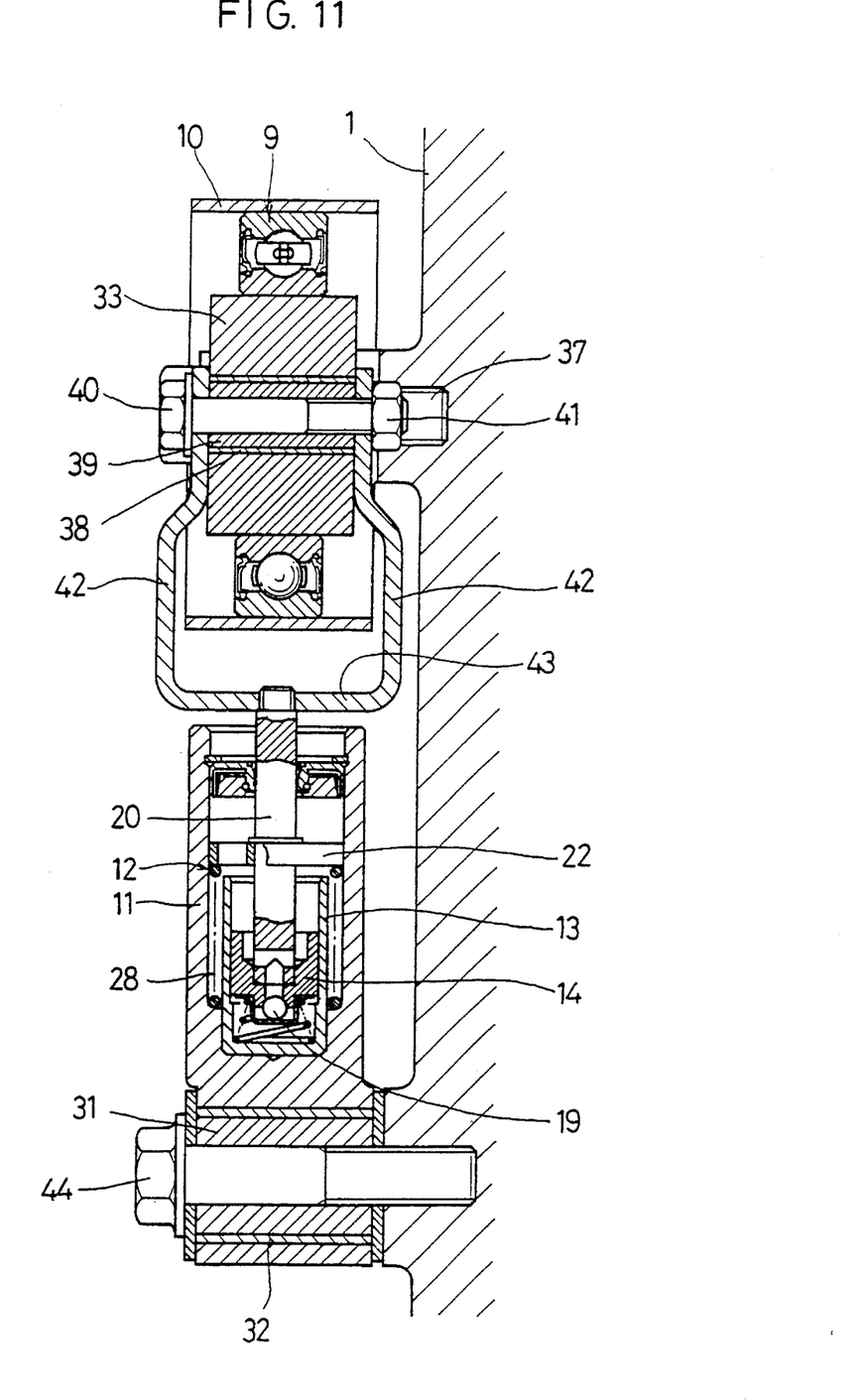
FIG. 11 is a sectional view taken along line XI—XI of FIG. 9.
Figure 12:
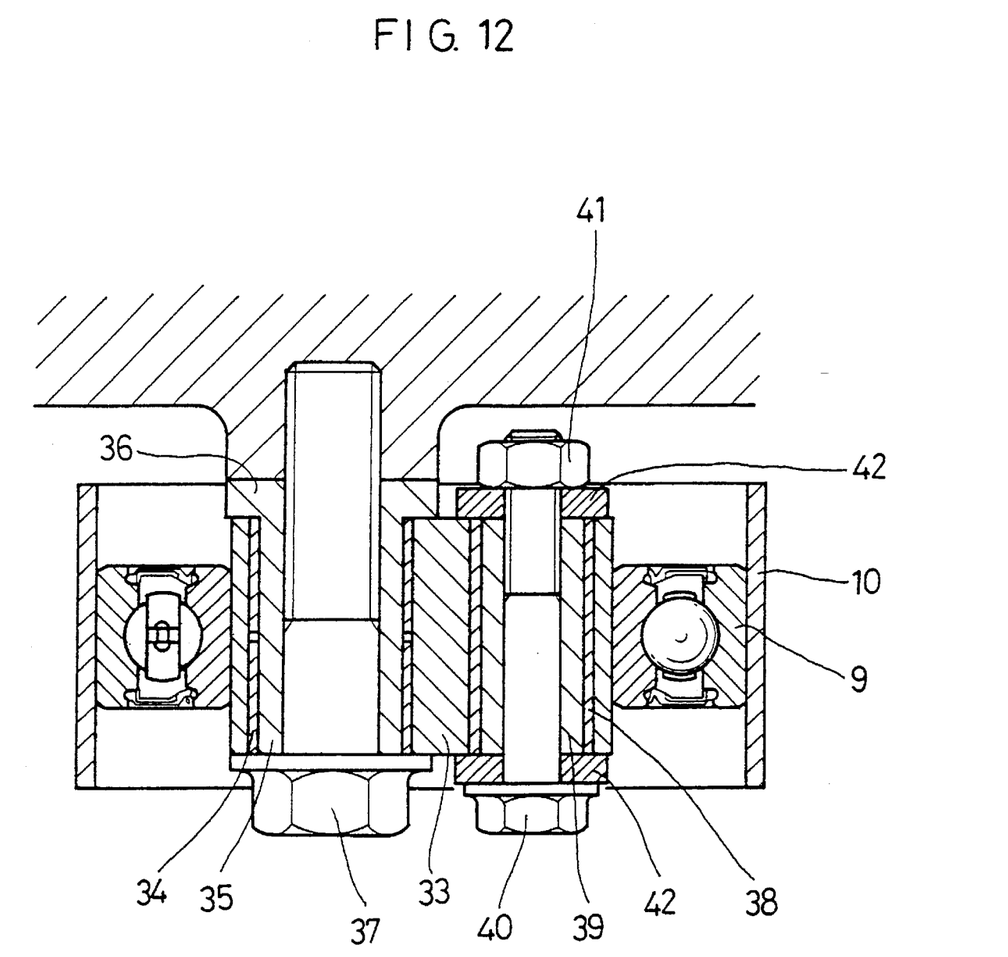
FIG. 12 is a sectional view taken along line XII—XII of FIG. 9.

In the fifth embodiment, shown in FIGS. 10 through 12, the cylinder 11 is mounted on the engine block 1 so that the pulley 10 is pivoted directly by the rod 20.

Namely, in the fifth embodiment, a bearing sleeve 31 is inserted in the bottom end of the cylinder 11 through a liner 32. A bolt 44 extends through the bearing sleeve 31 and is threadedly fixed to the engine block 1 so that the cylinder 11 is pivotable about the bolt 44. The cylinder 11 contains a hydraulic damper 12 of the same type as the damper shown in FIG. 7.

The pulley support shaft 33 has an eccentric through-hole in which is inserted a bearing sleeve 35 through a liner 34. The bearing sleeve 35 has a flange 36 bearing the pulley support shaft 33. A bolt 37 extends through the bearing sleeve 35 and is threadedly fixed to the engine block 1. A pulley 10 is mounted around the pulley support shaft 33 through a bearing 9. The pulley 10 is thus pivotable about the bolt 37.

By the side of the bolt 37, a coupling bolt 40, embraced by a liner 38 and a bearing sleeve 39, extends through the pulley support shaft 33. A link 42 has both ends thereof clamped between the head of the bolt 40 and the bearing sleeve 39 and between a nut 41 and the bearing sleeve 39. The bolt 40 extends through both ends of the link 42.

As shown in FIG. 11, the link 42 comprises upper and lower arms sandwiching the pulley support shaft 33 therebetween, and a coupling portion 43 coupled to the rod 20 of the hydraulic damper 12.

Now in operation, when the tension in the belt A increases, the pulley 10 will pivot clockwise (in FIG. 10) about the bolt 37, pushing the rod 20 into the cylinder through the link 42. Thus, it is possible to decrease the tension in the belt A while damping any violent motion.

When the tension in the belt A begins to decrease, the rod 20 is pushed out quickly, pivoting the pulley 10 in the opposite direction. The tension in the belt thus increases quickly.

In either case, the force acting on the rod 20 is borne by the engine block 1 through the bolt 44.

As described above, according the present invention, the pivotable arm carries the pulley support shaft and the cylinder with the built-in damper. The cylinder pivots with the pulley to adjust the tension in the belt. Since the pulley and the cylinder are arranged in parallel, it is possible to reduce the height of the entire autotensioner. Thus, the autotensioner can be mounted in a rather narrow space.

What is claimed is:

1. An autotensioner comprising a fixed member, an arm pivotally mounted on said fixed member, a pulley support shaft mounted on said arm, a pulley rotatably mounted on said pulley support shaft, a cylinder having a damper mounted therein and mounted on said arm, said arm being pivotable about an axis and both said pulley support shaft and said cylinder being mounted on said arm at positions offset from said axis, said damper having a rod mounted in said cylinder so as to be pushed out of and into said cylinder, and a stopper fixed to said fixed member, said rod being kept in contact with said stopper.

2. An autotensioner as claimed in claim 1 wherein said fixed member is detachably mounted on another fixed member.

3. An autotensioner as claimed in claim 1, wherein said damper is of a hydraulic type.

* * * * *